Sept. 28, 1926.  M. T. WESTON  1,601,518

RESILIENT WHEEL

Filed May 12, 1922

INVENTOR
Milton T. Weston
BY his ATTORNEYS
Knight Bros

Patented Sept. 28, 1926.

1,601,518

UNITED STATES PATENT OFFICE.

MILTON T. WESTON, OF NEW YORK, N. Y.

RESILIENT WHEEL.

Application filed May 12, 1922. Serial No. 560,324.

The invention described herein relates to that class of resilient wheels wherein an interior pneumatic tube is confined between a hub member and a tire member so as to give the resilience peculiar to such tubes without exposure of the same to the shocks and wear of road contact. The present invention is a continuation in part of U. S. Patent No. 1,431,610 granted in my name under date of October 10, 1922, wherein the construction and operation of my improved resilient wheel is fully set forth. The invention desired to be claimed herein consists of certain details of such wheels as will appear from the following description with reference to the accompanying drawings in which:

Figure 1:
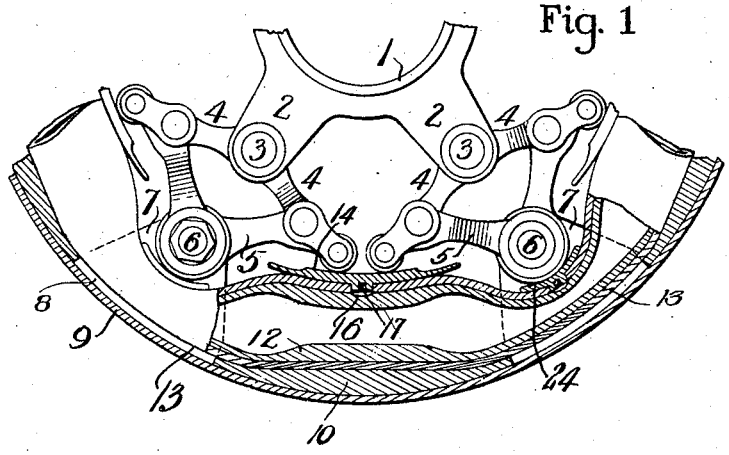
Figure 1 is a sectional view showing the part of my resilient wheel to which my present invention relates.

In the drawings the hub member 1 of the resilient wheel has a number of radial arms 2. Suitable articulate connections between the hub and rim members may be provided as follows: Pivot pins 3 in the outer ends of these arms have links 4 journaled thereon and these links are pivotally articulated with bent levers 5 which are in turn pivoted at 6 on the bracket arms 7 that extend inwardly from the part-circular plates 8 which are mounted on the inner periphery of a tire holding rim 9.

Figure 2:
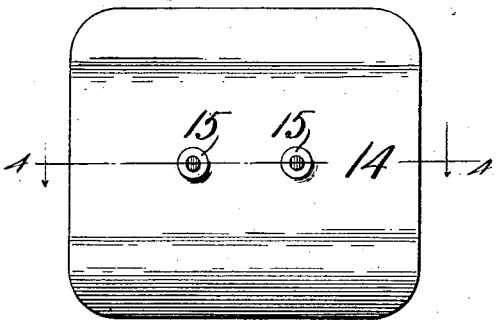
Figure 2 is an outside plan view of the pressure plate.
Figure 4:
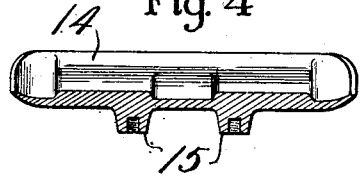
Figure 4 is a section on line 4—4 of Figure 2.
Figure 5:
Figure 5 is a section on the line 5—5 of Figure 3.
Figure 3:
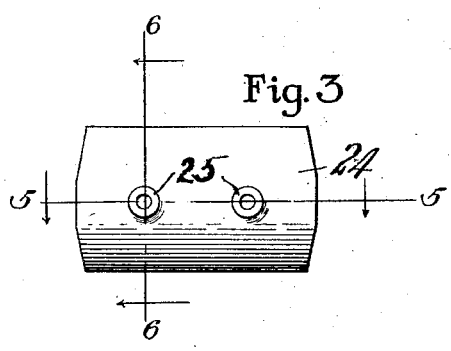
Figure 3 is an outside plan view of the anchor plate.
Figure 6:
Figure 6 is a section on the line 6—6 of Figure 3.

Interposed between the part-circular plates 8 around the inner periphery of the rim 9 are segmental blocks 10 provided with inwardly presented chordal surfaces which together with the inwardly presented surfaces of the part-circular plates 8, form a seat for the outer periphery of a pneumatic tube which is interposed between the rim and axle-contacting units of the wheel. Said pneumatic tube comprises an elastic inner tube 12 and an outer flexible shoe 13. Secured to the inwardly presented outer wall of the flexible shoe 13 at angularly spaced points, are a plurality of axially-flattened pressure plates 14. These pressure plates are so located circumferentially as to form flattened pressure areas whereby the pressure from the weight of the vehicle is brought to bear upon the pneumatic tube. The pressure plates are secured to the shoe of the pneumatic tube by lugs 15 which project through the wall of the shoe and on their inner ends have caps 16 secured to them by screws 17. Said pressure plates are shown detached in Figures 2 and 4 and as shown in Figure 1, are arranged at points of maximum flexure where the two free ends of the bent levers 5 bear upon the pneumatic tube. Figures 3, 5 and 6 show anchor plates 24 which, as shown in Figure 1, serve to anchor the pneumatic tube at the pivoted ends of bent levers 5. These anchor plates are provided with lugs 25 which project thru the wall of the shoe at those points and are thus secured in position in a manner similar to that employed in securing the pressure plates 14 in position. It is to be observed that pressure plates 14 are separate from each other and are secured to the pneumatic tube only. This construction results in a freedom of motion of these pressure plates that improves the resilient action of the wheel and saves wear and tear. The pneumatic tube is made with restricted sections which are adapted to interlock with anchor plates 24 where it is not subjected to flexure and with unrestricted sections where it is subject to maximum flexure. This construction results in an undulating contour of the inner periphery of the tube and this feature permits the compression of this part of the tube without stretching the fabric of which the tube is made. The outer tube is split circumferentially on its outer periphery to permit the introduction of the elastic inner tube and the attachment of the anchor and pressure plates.

I prefer to make the tube of a flattened cross section at the point where the plates bear upon it so as to enable me to so distribute the load thereon as to permit the use of air of considerable reduction of pressure.

I claim:—

1. In a resilient wheel of the character described, an inner hub member, an outer rim member, means articulately connecting said members, a pneumatic tube located between such members and having a plurality of sections capable of radial compression interposed between sections having no radial compression, pressure plates secured to said compressional sections, and anchor plates secured to said noncompressional sections, said pressure plates on the compressional sections being suspended from the anchor plates on the non-compressional sections by said tube alone.

2. In a resilient wheel, an inner hub member, an outer rim member, articulate connections between said members, a pneumatic tube comprising flattened pressure area portions for opposing the displacement of said articulate connections, portions anchored to one of said wheel members, and unsupported transition portions extending between the anchored and flattened pressure area portions.

3. In a resilient wheel, a tread member, a hub member, articulate connections between said hub and tread members, a pneumatic tube, circumferentially spaced anchor plates mounted on one of said members for anchoring portions of said pneumatic tube, said pneumatic tube being provided with flattened pressure areas arranged intermediately to said anchored portions, and pressure plates secured to said flattened pressure areas around the inner periphery of said pneumatic tube for transmitting pressures to said articulate connections, said pneumatic tube being provided with transition portions extending between said anchored portions and said flattened pressure area portions, said transition portions being unsupported along the inner periphery of the tube between said anchor plates and said pressure plates.

MILTON T. WESTON.